June 9, 1953     J. A. SIGG     2,641,478
SCREW DRIVER
Filed Oct. 18, 1947     2 Sheets-Sheet 1
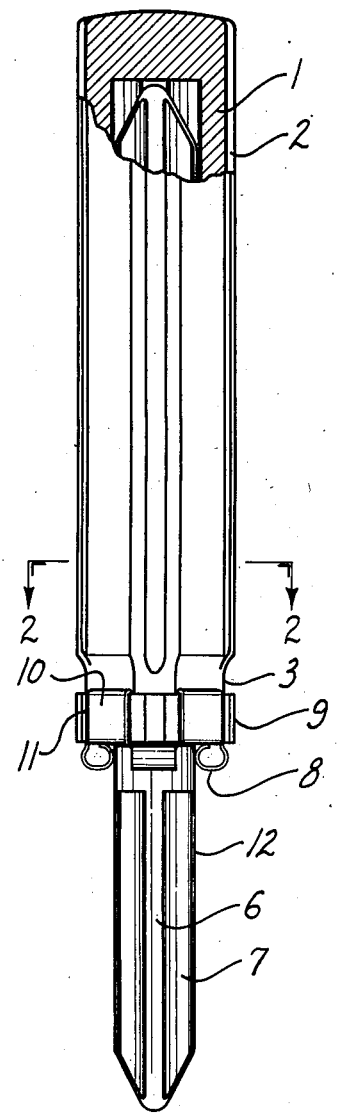
Fig. 1
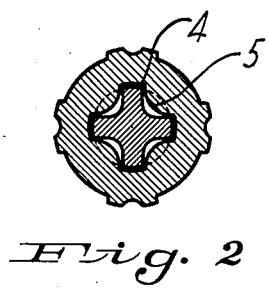
Fig. 2
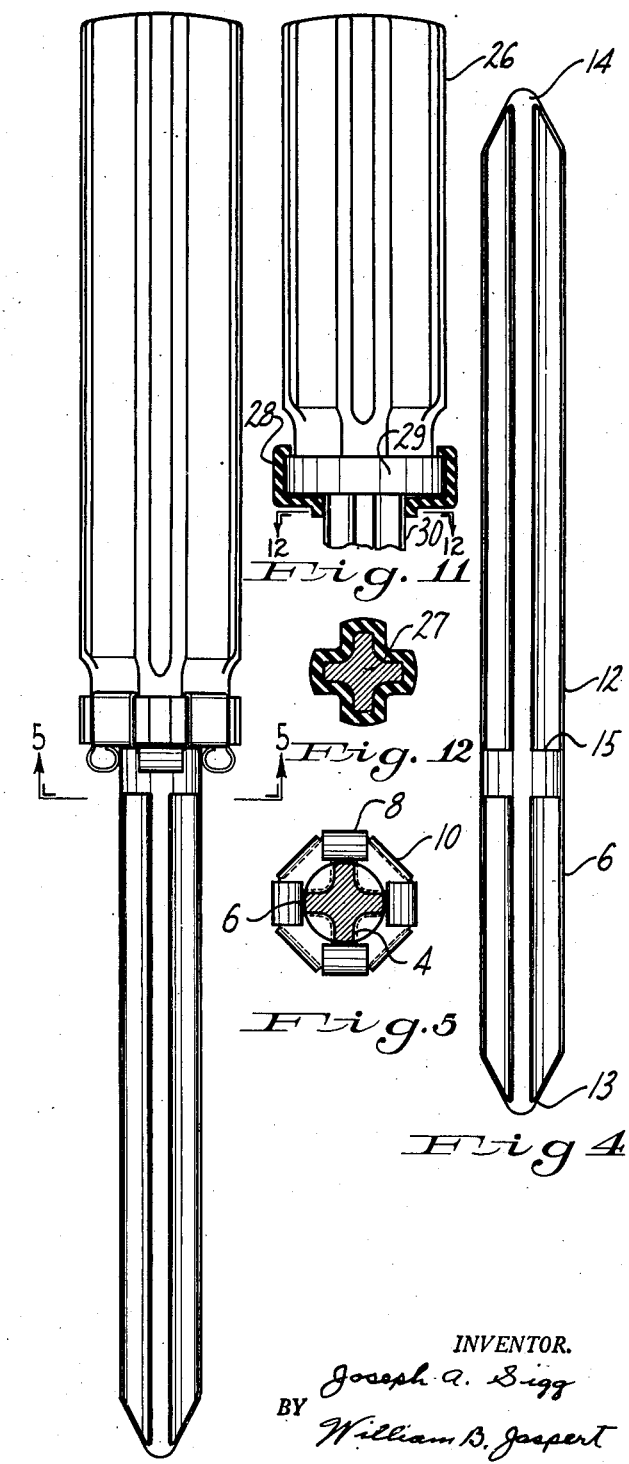
INVENTOR.
Joseph A. Sigg
BY William B. Jaspert
Attorney.

June 9, 1953 — J. A. SIGG — 2,641,478
SCREW DRIVER
Filed Oct. 18, 1947 — 2 Sheets-Sheet 2
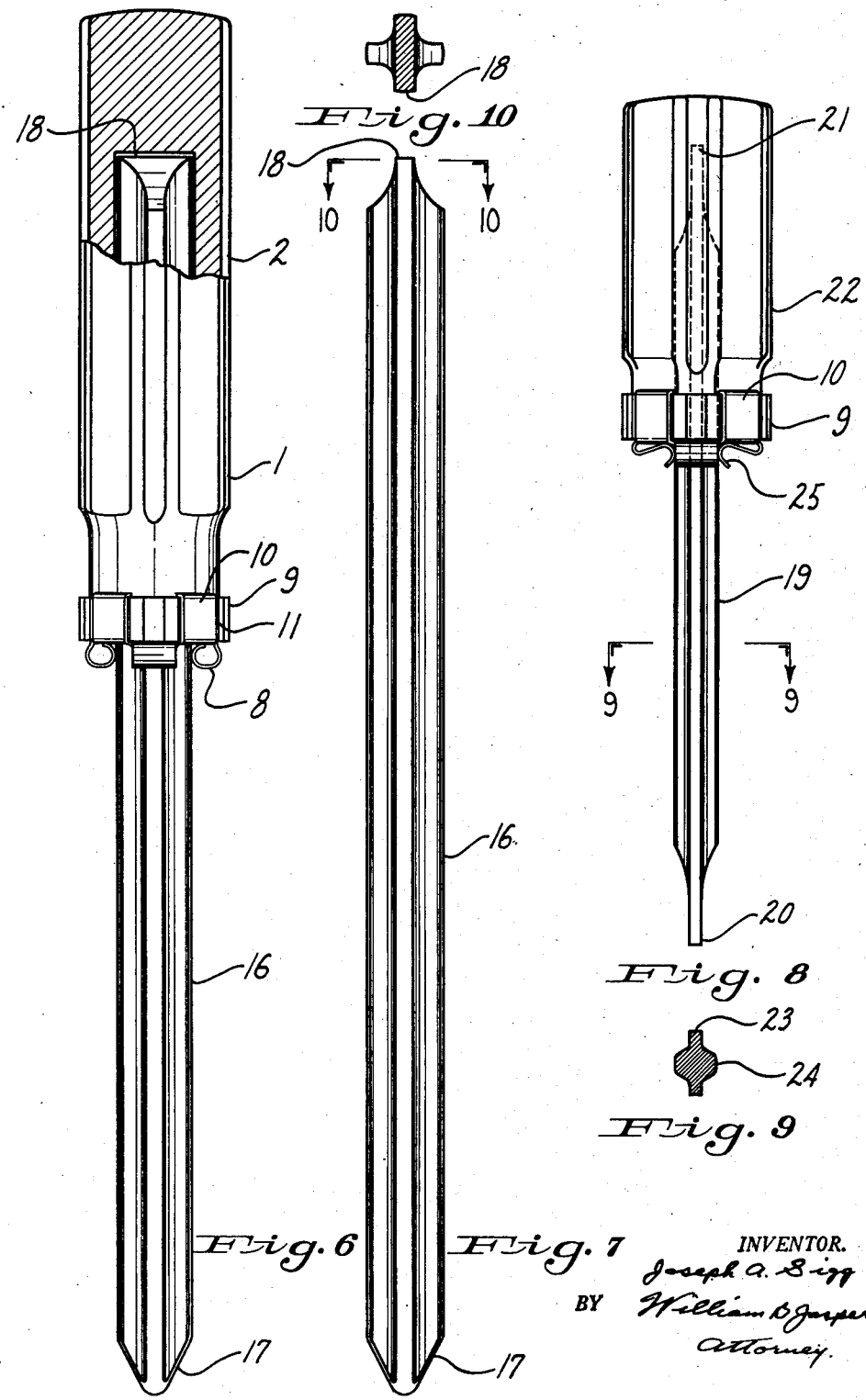
INVENTOR.
Joseph A. Sigg
BY William B. Jaspert
Attorney.

Patented June 9, 1953

2,641,478

UNITED STATES PATENT OFFICE 2,641,478

SCREW DRIVER

Joseph A. Sigg, Pittsburgh, Pa.

Application October 18, 1947, Serial No. 780,635

3 Claims. (Cl. 279—23)

This invention relates to new and useful improvements in screw drivers, and the present application is a continuation-in-part of an application serially numbered 622,590, filed by me October 16, 1945, now abandoned.

It is among the objects of the invention to provide screw drivers in which the shank of the screw driver cooperates with a handle member in a manner to reverse the shank to make available different screw driver bits.

It is a further object of the invention to provide a screw driver of the above designated character in which the handle portion is provided with tongues and slots for interacting with a complementary shaped portion of the screw driver bit shank.

Still a further object of the invention is to provide screw drivers of the above designated character in which friction means are provided for maintaining the relative position of the screw driver bit shank and handle while in use and yet permit the removal of the bit without manipulation of any locking means.

The invention will become more apparent from a consideration of the accompanying drawings, constituting a part hereof, in which like reference characters designate like parts, and in which Fig. 1 is a front elevational view, partially in section, of a screw driver embodying the principles of this invention;

Fig. 2 a cross sectional view thereof taken along the line 2—2, Fig. 1;

Fig. 3 a front elevational view of the screw driver of Fig. 1 showing the portion of the shank extending from the handle which is shown inside of the handle in Fig. 1;

Fig. 4 a front elevational view of the screw driver bit and shank employed in the structures of Figs. 1, 2 and 3;

Fig. 5 a cross sectional view, partially in elevation, taken along the line 5—5, Fig. 3;

Fig. 6 a front elevational view, partially in section, of a modified form of screw driver bit and handle;

Fig. 7 a front elevational view of the screw driver shank and bits;

Fig. 8 a front elevational view of another form of screw driver shank and handle;

Fig. 9 a cross sectional view taken along the line 9—9, Fig. 8;

Fig. 10 an end elevational view taken along the line 10—10, Fig. 7;

Fig. 11 a front elevational view partially in section of a modified form of screw driver with a part of the shank broken away; and Fig. 12 a cross sectional view thereof taken along the line 12—12, Fig. 11.

With reference to Figs. 1 to 5 inclusive of the drawings the numeral 1 designates a hollow screw driver handle of wood, plastic or other material having flutes or grooves 2 and having a neck portion 3. The handle is hollow and fluted at 4, as shown in Fig. 2, and is provided with arcs of circles 5, which flutes and arcs are complementary in shape to the tongues and grooves 6 and 7, respectively, of the screw driver shank. They may have a frictional engagement to hold the screw driver shank in working relation with the handle portion, but not necessarily so because of the provision of spring-like members 8 that are secured to a radial flange 9 of the screw driver handle by overlapping straps 10 that fit in notches 11 of the handle member. As is apparent from the shape of the spring members 8, they are not readily distorted and exert great friction or pressure on the shank of the screw driver.

In the form shown in Figs. 1 to 5, the screw driver shank, generally designated by the numeral 12, is provided with bits 13 and 14 at opposite ends, known as the Phillips type of bit, and is provided with a shoulder 15 dividing the shank into a long and a short part, either end of which may be inserted in the handle portion to make either a short or long screw driver as shown in Figs. 1 and 3 respectively.

As shown in Fig. 5, the notches 11 in the flange end 9 of the handle are disposed intermediate the flutes 4 of the handle whereby the spring elements 8 frictionally engage the tongues 6 of the shank.

With reference to Figs. 6 to 10 inclusive of the drawing, the screw driver shank 16 is provided with the Phillips type bit 17 and a flat screw slot bit 18, the latter being more clearly shown in Figs. 7 and 10. The shank may be reversed to make the bits interchangeable for use in either type of screw driver, the fluting of the handle and shank and the frictional engagement of the latter by the spring-like members 8 being the same as shown in connection with Figs. 1 to 5 of the drawings.

In the form of screw driver shown in Figs. 8 and 9, the shank 19, while being tongued and fluted as in the other designs, is provided with different size screw slot bits 20 and 21 so that when reversed in the handle portion 22 the screw driver has the utility of two sizes of screw driver bits. Also the shank 19 is of a different cross section as shown in Fig. 9, the tongues 23 being like those shown at 6 in Figs. 1 to 5 inclusive, but instead of the flutes 7 the shank is provided with relatively wide tongues 24, the handle portion being complementary shaped for receiving that type of shank.

Also in the screw driver of Fig. 8, the spring engaging elements are S-shaped as shown at 25, but otherwise the attachment by the strap like members 10 to the flanged end 9 is as previously explained.

In the construction of screw drivers shown in Figs. 11 and 12, the handle 26 may be constructed similar to that of the remaining figures of the drawing and the cross section of the shank 27 may be similar as appears from Fig. 12. It differs, however, from the other structures in that rubber, in the form of a premolded grip 28 engages the flange 29 and is constricted to engage the tongued and fluted surfaces of the screw driver bit 30 as shown in Fig. 12.

The utility of the screw drivers of the type disclosed in the several figures of the drawings is apparent from their design in that they provide for interchangeability of different screw driver shanks or different ends of the same shank having different bits or to provide different lengths of shanks. By means of the construction shown the shank and handle portion are interlocked against turning the full length of the shank portion that is inserted in the handle, thereby eliminating wear on the interacting surfaces of the shank and handle and providing a strong rigid construction.

By means of the spring structure interlockingly mounted on the flange portion of the handle and frictionally engaging the shank of the screw drivers, they will not drop out even though there is no other frictional engagement between the shank and handle portion. The construction of the spring grip is such as to not interfere with the removal or insertion of the screw driver shank in the handle portion and are of such shape that they will not be readily distorted from handling or mingling with the other tools in a tool chest.

Although several embodiments of the invention have been herein illustrated and described it will be apparent to those skilled in the art that various modifications may be made in the details of construction without departing from the principles herein set forth.

I claim:

1. In a screw driver having interchangeable bits, a handle portion therefor and clamping means at the inner end of the handle portion comprising a sheet metal member having crimped ends interacting with a shoulder of the handle portion and having looped ends constituting spring members for yieldingly engaging the body of the screw driver, said clamping means having a depending body portion of the shape of the screw driver shank for receiving the screw driver shank.

2. In a screw driver, a hollow handle portion having sockets spaced ninety degrees and extending the full length of the hollow portion for receiving tongues of a screw driver shank, and clamping means at the inner end of the handle portion comprising a sheet metal member having crimped ends interacting with a shoulder of the handle portion and having looped ends constituting resilient means for engaging the body of the screw driver.

3. In a screw driver for interchangeable bits, a handle having a hollow interior, the inner wall of which is provided with tongues and grooves the full length of the wall for engaging the complementary shaped shank of a screw driver bit, said handle having spring means with rounded surfaces for grippingly engaging the tongues of the screw driver shank.

JOSEPH A. SIGG.

References Cited in the file of this patent

UNITED STATES PATENTS

| Number | Name | Date |
|---|---|---|
| 294,663 | Parmelee | Mar. 4, 1884 |
| 733,342 | Stevens | July 7, 1903 |
| 952,570 | Lamb | Mar. 22, 1910 |
| 1,328,428 | Graham | Jan. 20, 1920 |
| 1,648,798 | Crook | Nov. 8, 1927 |
| 1,853,128 | Hysing et al. | Apr. 12, 1932 |
| 1,961,246 | Powers | June 5, 1934 |
| 2,089,121 | Hartung | Aug. 3, 1937 |
| 2,158,728 | Peters | May 16, 1939 |
| 2,378,775 | Johnson | June 19 1945 |

FOREIGN PATENTS

| Number | Country | Date |
|---|---|---|
| 20,816 | Germany | Jan. 15, 1893 |
| 486,294 | France | Dec. 28, 1917 |
| 202,043 | Great Britain | Aug. 13, 1923 |